United States Patent [19]
Keller

[11] 4,222,987
[45] Sep. 16, 1980

[54] MUFFLE CALCINER HAVING COUNTER-ROTATING SCREW CONVEYORS

[75] Inventor: David P. Keller, Morrisville, Pa.

[73] Assignee: Cities Service Company, Tulsa, Okla.

[21] Appl. No.: 918,758

[22] Filed: Jun. 26, 1978

[51] Int. Cl.² .......................... B01J 6/00; F27B 5/10; F27B 9/20; F27D 3/08
[52] U.S. Cl. .................................... 422/150; 422/229; 432/121; 432/154; 432/209; 432/213; 432/245
[58] Field of Search .............. 422/150, 307, 309, 154, 422/229; 432/121, 154, 206, 209, 31, 212, 213, 226, 230, 245, 249, 254.1; 202/118; 201/17, 32

[56] References Cited

U.S. PATENT DOCUMENTS

| | | | |
|---|---|---|---|
| 1,538,385 | 5/1925 | Daman | 432/154 |
| 2,398,446 | 4/1946 | Phillipson | 202/118 |
| 2,459,951 | 1/1949 | Metzner | 202/118 |
| 2,463,693 | 3/1949 | Huff | 202/118 |
| 3,178,361 | 4/1965 | Bailey | 202/118 |
| 3,985,637 | 10/1976 | Storrs | 432/121 |

Primary Examiner—Bradley R. Garris
Attorney, Agent, or Firm—George L. Rushton

[57] ABSTRACT

The calciner is an elongated, insulated chamber, in which material is fed to counter-rotating screw conveyors. The material is calcined by heat radiating from a muffle plate interposed between the conveyors and gas-fired burners. This radiant heating, applied evenly to material naving a constantly-exposed fresh surface, results in increased production, lower fuel cost per pound of product, and higher quality product.

4 Claims, 3 Drawing Figures

U.S. Patent Sep. 16, 1980 4,222,987
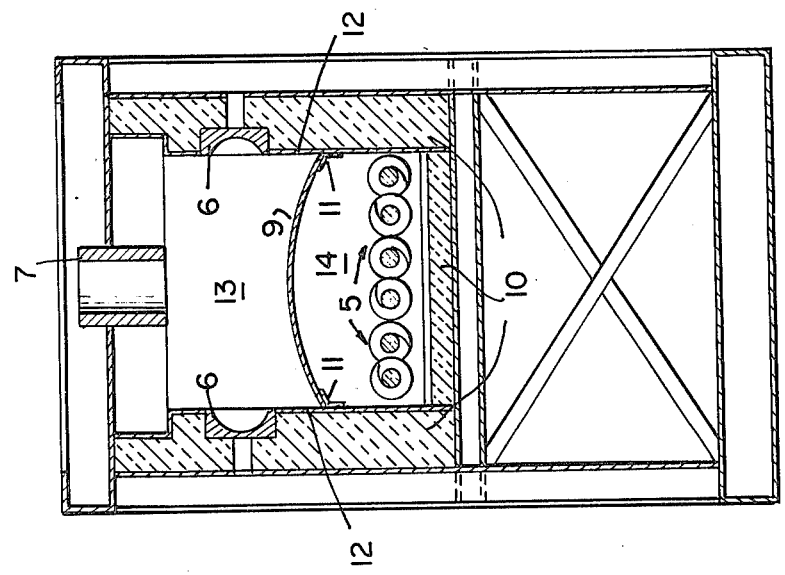
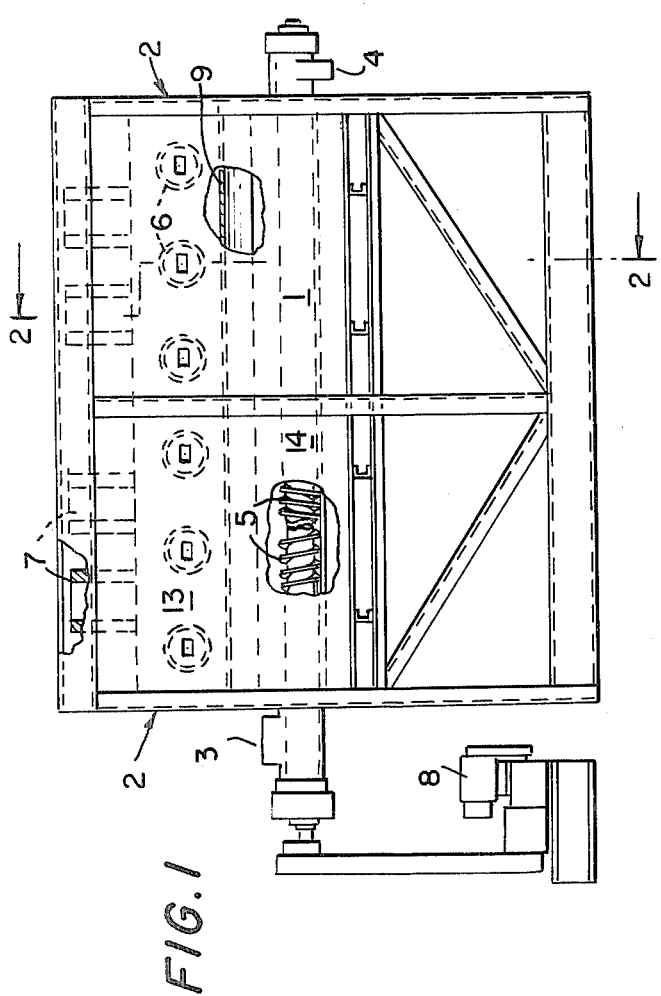
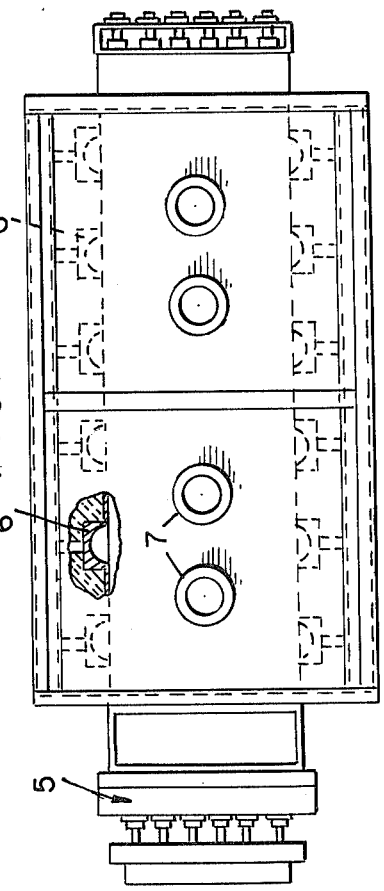

MUFFLE CALCINER HAVING COUNTER-ROTATING SCREW CONVEYORS

BACKGROUND OF THE INVENTION

The present invention relates to furnaces, particularly to those furnaces known as calciners. In a calciner, heat from a heat source is transmitted to the material to be calcined. Calcination typically involves a chemical or physical change, such as oxidation or dehydration of a material. In the pigment industry, yellow iron oxide, exemplified as $Fe_2O_3 \cdot H_2O$, is calcined (heated) to remove the water, resulting in red iron oxide, $Fe_2O_3$. Another process of obtaining red iron oxide involves heating $FeSO_4 \cdot 7H_2O$ (copperas) to form $FeSO_4 \cdot H_2O$, and then calcining (roasting) the monohydrate in a rotary furnace to form $Fe_2O_3$. The present invention concerns a calcining apparatus capable of producing iron oxide "tans," in which another metallic oxide, such as zinc oxide or magnesium oxide, is combined with a majority of iron oxide, under the influence of heat, to form a ferrite, exemplified as $M(FeO_2)_2$, where $M=Zn$ or $Mg$.

Prior art calciners are typically rotary kilns, as shown and discussed in Perry's "Chemical Engineers' Handbook" (4th Ed., McGraw-Hill), particularly pages 20-15 through 20-31 and FIGS. 20-24, 20-36, and 20-37. A burner, burning gas or oil, supplies hot combustion gases. The material to be calcined, in this case iron oxide, is fed into the upper end of the calciner. The heat from the combustion gases is conducted in the iron oxide. Rotation of the calciner retort exposes the iron oxide to the heat, thus calcining the iron oxide.

Prior art calciners have the following disadvantages:
(a) Temperature control of the calcinable material is difficult, leading to variations in product quality.
(b) Uniform retention time of product particles is difficult, leading to variations in product quality.
(c) The inner retort surfaces frequently becomes unevenly coated with a layer of iron oxide, of variable thickness, leading to uneven heat conductivity and resultant variations in product quality.
(d) At the higher temperatures required for calcining "tans," maintenance is difficult and costly.
(e) The system is inefficient, based on the energy requirement per pound of calcined product.

Typically, a calciner to produce "reds" operates in the temperature range of 700°-1700° F. (370°-925° C.), with a retention time of 9 to 18 minutes. Under these conditions, the calciner retort life is of the order of 6 to 11 years. On the other hand, a calciner for "tans" operates in the 1750°-1850° F. (950°-1010° C.) range, with a retention time of 18 to 36 minutes. Under these conditions, the calciner retort life is about 1 to 3 years.

SUMMARY OF THE INVENTION

My invention concerns an improved calciner, in which the previous problems are eliminated or markedly reduced. In my invention the heating energy is transferred radiantly and indirectly from the heat source, such as a ceramic bowl type burner, fed by gas or oil, to the material to be calcined. Rotary screws move the material through the calcining zone. Compared with prior art calciners, my improved calciner produces more product, at the same calcining temperature. The improved calciner uses about one-half the heat energy for the same amount of product.

My improved apparatus comprises:
an elongated, insulated chamber having a feed opening and a discharge opening,
conveyor means for transporting calcinable material from the feed opening to the discharge opening,
heating means mounted within the chamber operative to direct heat energy throughout the interior of the chamber,
a muffle, or baffle, mounted within the chamber and extending along the path traversed by the calcinable material, said muffle being so positioned within the chamber that the chamber is divided into two elongated compartments effective to shield and protect the heating means from said material, and
vent means in the compartment housing the heating means providing an outlet to the exterior of the chamber.

DESCRIPTION OF THE DRAWINGS

FIG. 1 is a side view, in section, of one embodiment of the calciner of the invention.

FIG. 2 is an end view, in section, of the calciner shown in FIG. 1.

FIG. 3 is a top view, in section, of the calciner of FIGS. 1 and 2.

DETAILED DESCRIPTION OF THE DRAWINGS

Referring to FIG. 1, the calciner is shown as a chamber 1 formed by framework 2, the chamber having a feed opening 3 and a discharge opening 4. The material to be calcined is moved from the feed opening 3 to the discharge opening 4 by a conveyor means 5, with the calcinable material in the conveyor means being exposed to a heating means 6 mounted in the chamber 1. Chamber 1 contains vent means 7 (or exhaust means) that provide an outlet to the exterior of chamber 1. A drive means 8 is provided to power conveyor means 5.

The end view provided by FIG. 2 shows the conveying means, defining screw conveyors as exemplified by 3 pairs of counter-rotating screws. One screw of each pair is formed with a right hand thread and the other with a left hand thread. At least one pair of screws is needed, and additional screws may be used to increase the capacity of the calciner. By the very nature of screw conveyors, the material to be calcined is periodically exposed to the heating means, and the retention time in the calcining chamber is easily regulated and made uniform, as compared to prior art calciners. Baffle or muffle 9 is shown as a convex member, such as a solid steel plate, inserted between the screw conveyors and the heating means, exemplified by gas-fired, ceramic bowl burners. The muffle, supported by clips 11-11 secured to side walls 12—12, extends throughout the interior of the chamber 1 and divides the chamber into two elongated compartments 13 and 14. The muffle is preferably made of heat-resistant stainless steel.

The muffle is impervious and operates to keep compartment 13 free of material being calcined in compartment 14. The muffle is heated by the burners, and the heated muffle in turn radiates heat to the material to be calcined, as the material is moved by the conveyors. The muffle thus distributes heat somewhat evenly, at a controlled temperature, to the material to be calcined, thus reducing the incidence of uneven heating found in prior art calciners of the rotary type. The muffle prevents calcinable material from contacting the burner, which contact reduces the burner efficiency. And the muffle is not in direct contact with the calcinable material, so the efficiency of radiation from the muffle is not reduced. Insulation 10 encloses the heating means 6, conveyor means 5, and muffle 9, with vent means 7 installed in a generally normal fashion to the insulation.

The value of the invention is shown by comparative production rates of a prior art calciner and the apparatus of the present invention. One example of a rotary calciner has a 26-inch diameter furnace, 18 feet long. The dimensions of one embodiment of the present invention are 3.3 feet for the calciner chamber width and height, the length being 15 feet. The diameter of the rotating screws is 6 inches. The approximate volume of the prior art calciner is 66.5 cu. ft., while the volume of the calciner of the present invention is about 155 cu. ft. It should be remembered that, in each case, the total internal volume of the calciner cavity is not available for use.

|  | Gas-fired Rotary kiln calciner | Present Invention |
| --- | --- | --- |
| Output (lbs/hr.) | 200 | 1000 |
| Gas consumption (cf/lb.) | 5 | 2.4 |

While the present invention has been described herein with reference to particular embodiments thereof, it will be appreciated by those skilled in the art that various changes and modifications can be made without departing from the scope of the invention.

I claim:

1. Apparatus for calcining iron oxides comprising:
   an elongated, insulated chamber having a feed opening and a discharge opening,
   conveyor means for transporting calcinable material from the feed opening to the discharge opening, comprising at least one pair of counter-rotating screw conveyors,
   heating means mounted within the chamber,
   operative to direct heat energy throughout the interior of the chamber, comprising at least one gas-fired ceramic bowl burner,
   a muffle mounted within the chamber and extending along the path traversed by the calcinable material, said muffle being positioned within the chamber so that the chamber is divided into two elongated compartments effective to shield and protect the heating means from said material, and said muffle being fabricated of heat-resistant stainless steel and presenting a convex surface to the heating means, and
   vent means in the compartment containing said heating means providing an outlet to the exterior of the chamber.

2. The apparatus of claim 1 in which one screw conveyor is formed with a right hand thread and the other conveyor is formed with a left hand thread.

3. The apparatus of claim 1 in which the baffle is impervious.

4. The apparatus of claim 1 in which the heating means is sufficient to furnish a calcining temperature of from about 700° F. to about 1850° F.

* * * * *

Disclaimer 4,222,987.—*David P. Keller*, Morrisville, Pa. MUFFLE CALCINER HAVING COUNTER-ROTATING SCREW CONVEYORS. Patent dated Sept. 16, 1980. Disclaimer filed Mar. 30, 1981, by the assignee, *Columbian Chemicals Co.*

The term of the patent subsequent to Mar. 17, 1981, has been disclaimed.

[*Official Gazette May 26, 1981.*]